US005137366A

United States Patent [19]

Hill et al.

[11] Patent Number: 5,137,366

[45] Date of Patent: Aug. 11, 1992

[54] MIXER VEHICLE

[76] Inventors: Paul C. Hill; Leonard A. Hill, both of 7604 Bellini Way, Sacremento, Calif. 95828; Felesta Smith, c/o Telechute, Inc. 8263 Alpine Ave., Suite A, Sacramento, Calif. 95826

[21] Appl. No.: 516,335

[22] Filed: Apr. 26, 1990

[51] Int. Cl.[5] .......................... B28C 5/20; B28C 7/16; B60P 1/16; F16D 11/10

[52] U.S. Cl. .................................. 366/47; 192/67 R; 298/22 R; 366/60; 366/63

[58] Field of Search ....................... 366/45, 46, 47, 57, 366/60, 63, 24, 25; 298/19 R, 17 R, 22 R; 280/490.1, 511; 192/67 R, 67 P

[56] References Cited

U.S. PATENT DOCUMENTS

| | | | |
|---|---|---|---|
| 751,898 | 2/1904 | Bodlaender | 366/60 |
| 1,054,871 | 3/1913 | Seashole | 298/22 R |
| 1,564,180 | 12/1925 | Willard | 366/45 |
| 1,922,700 | 8/1933 | Knowles | 366/63 X |
| 2,327,308 | 8/1943 | Johnston | 280/490.1 X |
| 2,328,343 | 8/1943 | Jacob | 280/490.1 |
| 2,507,077 | 5/1950 | Williams | 366/60 |
| 2,561,765 | 7/1951 | Wood | 192/67 R X |
| 2,595,474 | 5/1952 | Marvin | 280/490.1 |
| 2,599,852 | 6/1952 | McClain | 366/60 |
| 2,699,852 | 1/1955 | Cost | 192/67 R X |
| 3,131,913 | 5/1964 | Swarthout | 366/45 X |
| 3,610,690 | 10/1971 | Mengel | 298/22 R X |
| 4,491,415 | 1/1985 | Bishop | 366/60 X |
| 4,516,670 | 5/1985 | Sorensen, Jr. | 192/67 P X |

FOREIGN PATENT DOCUMENTS

| | | | |
|---|---|---|---|
| 498827 | 9/1954 | Italy | 366/60 |
| 308006 | 3/1929 | United Kingdom | 366/60 |

*Primary Examiner*—Harvey C. Hornsby
*Assistant Examiner*—Scott J. Haugland

[57] ABSTRACT

A small mixer vehicle structured as a trailer has clutching mechanics for frictionally revolving a rotatable drum during towing and for both manual and powered auxiliary drum turning when the trailer is parked. For manual drum turning, an attachable crank is provided. The crank attachment also accepts connection by a hydraulic motor which is remotely powered by an auxiliary pump. The trailer drum support structure has mechanics for placing the drum in a tilted position for unloading and for returning the drum to a horizontal towing position. A tow bar attached to the trailer includes adjustable mechanics for leveling the trailer.

2 Claims, 6 Drawing Sheets

MIXER VEHICLE

BACKGROUND OF THE INVENTION

1. Field of the Invention

This invention relates to trailers and other vehicles equipped with rotatable drums structured to receive separated materials and having mechanics to mix the separated materials into a useful blend such as dry aggregates or wet concrete ready for use. The present invention is particularly directed towards a vehicle equipped with a turnable mixing drum having mechanics for frictionally turning the drum during movement of the vehicle and with the same mechanics useful alternately for turning the drum by manual and auxiliary powered attachments. A hydraulic pump operating a ram is included to reposition the drum for dumping at a job site. The mixer vehicle according the invention is useful as a trailer for hauling dry concrete and aggregate mixes and for transporting ready-mixed concrete. The drum can also be loaded at the job site from a small specialized portable conctrete batch plant and is equipped for using powering providing by the batch plant to keep the mixer drum rotating while the vehicle is stationary. Ready mixed concrete can set up quickly if hauled in a box-type trailer or in a drum trailer which is not turned during even a short haul. Under these conditions, the concrete becomes useless and extremely difficult to remove. Even setting at a job site in a non-turning drum for a short time, concrete can become a major problem to extract from the carrier or to dispose of. The immediate invention has been developed to overcome difficulties imputed to other portable mixers.

2. Desription of the Prior Art

Although small batch concrete hauling and mixing vehicles, trailers and wheelbarrow types, are readily available for rent and for sale in the market place, these small batch concrete hauling vehicles are really not very efficient even equipped with turnable drums. Some trailers types having gasoline moters which turn mixing drums are good enough for limited concrete mixing for the do-yourself home fixer upper provided he has patience and is only doing minor repairs or small area projects. A vehicle for small batch mixing of aggregate or concrete with a good volume capacity drum which will turn during towing or which can be turned by hydrualics or manually while the trailer is parked is not seen in the market place. This is particularly true if the drum is positionable for loading and for discharging the mixture.

From a patent search conducted in classes and subclasses 366/45, 47, 48, and 63 to ascertain state of the art, patented devices considered most pertinent to our invention included the following U.S. Patents:l U.S. Pat. No. 1,439,178 issued Dec. 19, 1992 to to Levi Lund shows a rather complicated gearing and chain means for turning and tilting a concrete mixing barrel. The devices is mounted on a truck frame for road work.

Another chain and gearing system for turning and tilting a concrete mixer is illustrated in the Howard B. Evans patent issued Apr. 21, 1925, U.S. Pat. No. 1,534,366. The Evans' device is mounted on a two-wheeled trailer and a moter housing is included.

U.S. Pat. No. 2,176,874, issued to Dee St. John on Oct. 24, 1939, illustrates a manually powered wheelbarrow type concrete mixing drum. The device consists of a small drum turnably housed atop a one wheel frame, wherein the frame and unit must be manually pushed to rotate the drum.

E. R. Fesenmaier was issued U.S. Pat. No. 2,299,888, on Oct. 27, 1942 for a concrete mixer utilizing dismantled car parts for the frame and wheel portion of the device. The device consists of a dumping drum which is rotatable by the movement or towing of the unit by a car or other vehicle.

Another towable, rotating concrete mixer was patented by W. Muller on Nov. 9, 1948, U.S. Pat. No. 2,453,583. Improvements were directed towards the mounting and repositioning ability of the drum and the addition of a power unit to provide rotation.

U.S. Pat. No. 3,326,537, was issued to J. S. Wallace on Jun. 20, 1967, for a transit concrete mixer designed primarily to mix the batch of cement en route to the job site by the rotation of the wheels of the trailer. No power supply is provided to rotate or dump the drum.

Andrew B. Clement was issued U.S. Pat. No. 4,042,222, on Aug. 16, 1977, for a small, manually powered rotatable mixer. The rotation or mixing of the contents of the drum is also achieved by towing the device behind a motor vehicle.

On Jun. 14, 1983, Edwin J. Routson was issued U.S. Pat. No. 4,387,995, for another small, manually powered rotatable mixer. The drum of said mixer sits at a right angle to the frame and removal of the contents is accomplished from the side instead of the rear of the unit.

Although several disclosures of rotatable drum cement mixers for transporting small batches of concrete were uncovered in the search, none were seen with a clutching arrangement on a drum turning drive shaft so the drum would turn during towing and the towing attachment could be disengaged so the drum could be turned manually while the trailer was parked or the drum could be turned by mechanical attachments.

SUMMARY OF THE INVENTION

Therefore, in practicing our invention we have provided a mixer vehicle with a rotatable drum. The mixer vehicle according to the invention is embodied in a trailer having mechanics for turning the rotatable drum. The same mechanics can be used for continuing to turn the drum while the trailer is standing still. The rotatable drum is tubular and is positioned longitudinally aligned horizontally on a drum support frame which rests in parallel alignment on top of a horizontally oriented base frame. The base frame in turn is supported by two sets of tandem road wheels. One set of two road wheels in the tandem arrangement are on each side of the base frame. The support frame is attached pivotally rearward to the base frame. The base frame is affixed in a frontal position with an angled tow bar support to which an extending single arm tow bar is attached providing a towing attachment for towing the mixer vehicle by a powered vehicle. The angle of the tow bar relative to the base frame is adjustable by a crank turning a levering arrangement at the base frame attachment end of the tow bar which is pivotal. The tow bar adjustment allows the tow bar angle of attachment to a vehicle to be adjusted so the mixer trailor base frame can be leveled relative to the hieght of the trailer attachment ball on the towing vehicle. A saftey arm with a stop plate affixed facing the closed end of the rotatable drum is attached to a cross support extending between the angled arms of the angled tow bar support. This safety arm and stop plate is to help prevent an accidental forward shift of a loaded rotatable drum should it break loose during a sudden stop or an accident. However, our mixer vehicle has been designed with durability, stability, and safety in mind having additionally, a restraining strap designed to stabilize the load and prevents the drum section from dislodging and causing injury. The mixer vehicle according to the invention in the trailer structure is also stabilized for towing to prevent "fishtailing" or overturning, with independent suspension, tandem axles, and hydraulic surge brakes.

For loading separated materials or ready mixed materials such as concrete, the mixer trailer according to the invention is unique in that it features a manual hydraulic pump system located at the dump end of the drum. The dumping controls are effortless to operate and strategically positioned so that mixed materials such as concrete can be observed while being unloaded. The hydraulic pump system operates a hydraulic ram placed between the drum supporting frame and the base frame. When pumped, the hydraulic ram raises the drum support frame at the closed end of the drum placing the drum in a desired and controlled position for dumping a mixture. When a release valve on the hydraulic pump is opened, the drum returns to a generally longitudinal horizontal position normal for mixing and hauling materials.

The rotatable drum is turned by a drive shaft normally driven by a driver wheel placed between the tandem road wheels on one side of the base frame deriving turning power from frictional contact with one or more of the tandem street wheel. The drive shaft has a clutch to release the driver wheel which operates while the trailer is being towed and allows attachment of a manual turning device such as a crank or an auxiliary powering unit such as a hydraulic moter for turning the rotatable drum when the trailor is still standing still. The driver wheel shaft is retained by a spring biased releasable fitting and the driver wheel can also be released by moving the driver wheel out of contact with the street wheel or wheels.

Therefore, a primary object of our invention is to provide a mixer vehicle structured as a towable trailer supporting a rotatable drum turned by a clutched drive shaft which when the clutch is engaged allows the rotatable drumm to be turned by a driver wheel powered by frictional contact with street wheels when the trailer is in motion.

Another object of the invention is to provide a mixer vehicle structured as a towable trailer supporting a rotatable drum turned by a clutched drive shaft which when the clutch is disengaged allows the rotatable drum to be turned by a manual unit such as crank or by a mechanical device such as a hydraulic moter.

A further object of our invention is to provide a mixer vehicle with a rotatable drum having mechanics for rotating the drum while the mixer vehicle is in motion as a trailer being towed and while the mixer vehicle is stationary as a trailer parked.

A still further object of the invention is to provide a mixer vehicle structured as a towable trailer having mechanics for raising and lowering an opened end of a rotatable drum for loading mixed materials or materials to be mixed and for dispensing the materials after mixing.

A still futher object of the invention is to provide a versatile mixer vehicle having internal agitation vanes in a rotatable drum with the mixer vehicle useful for mixing both dry and wet materials and for maintaining ready-mixed materials in a viable state during transportation from a distant batch plant to a job site.

An even futher object of this invention is to provide a mixer vehicle in a trailer structure with a rotatable drum which can function with an accessory batch plant for loading dry materials such as a concrete mix and the drum can be revolved to mix the materials wet or dry at the job site.

Other objects and the many advantages of our invention will be readily understood by reading the following specification and the desriptions of numbered parts and subsequent comparison of the described parts with the same parts illustrated in the drawings designated by the same numbers.

BRIEF DESRIPTION OF THE DRAWINGS

In the drawings:

FIG. 1 shows a mixer vehicle in a trailer structure according to the invention in a side view from an auxiliary power attachment side. A rotatable drum is mounted on adjustable framing. The framing is shown supported by tandem street wheels. Adjustable movement of a frontal tow bar for trailer leveling is indicated by dotted lines.

Figures 4, 5:
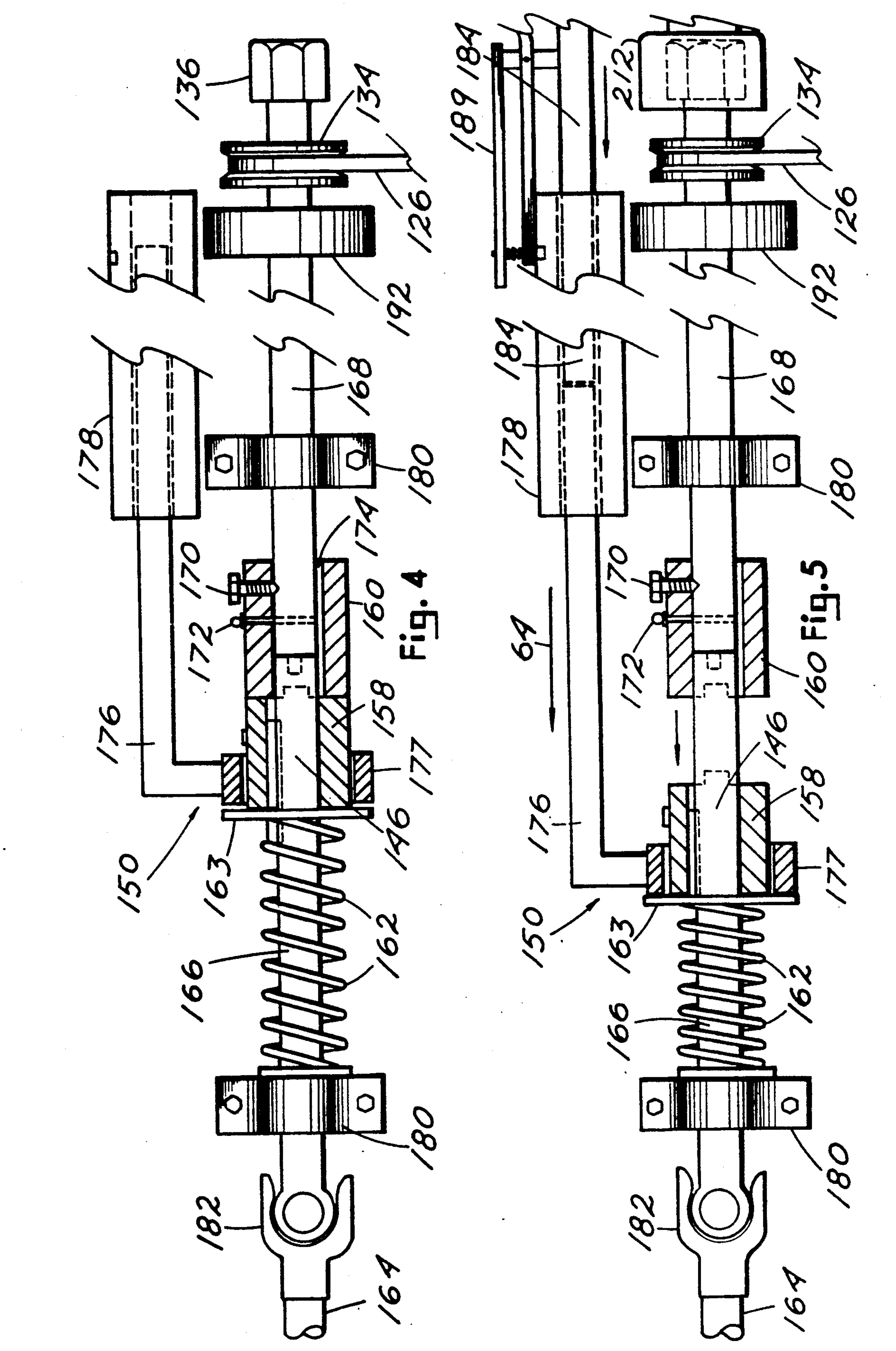

FIG. 4 is a top view of a portion of a drive shaft positioned in the vehicle lifting frame showing clutching which provides engagement and disengagement for turning the rotatable drum by a driver wheel attached to the driver wheel shaft end or for turning the drum from the opposite end by auxiliary powering or hand cranking. The two interlocking couplers which provide the clutching by sliding together are shown engaged in the FIG. 4 illustration. A bias compression spring maintains the couplings normally engaged as illustrated.

FIG. 5 is a top view of the same portion of the drive shaft shown in FIG. 4 with the clutch disengaged. A release rod is shown pushed into a clutch activator housing at the top of the drawing. A clutch arm activated by the release rod is shown compressing the biasing spring causing separation of the two couplers to disengage the clutch and to free the driver wheel side of the shaft. As illustrated, the right hand side of the drive shaft can now be used with auxiliary power for turning the rotatable drum.

Figure 6:
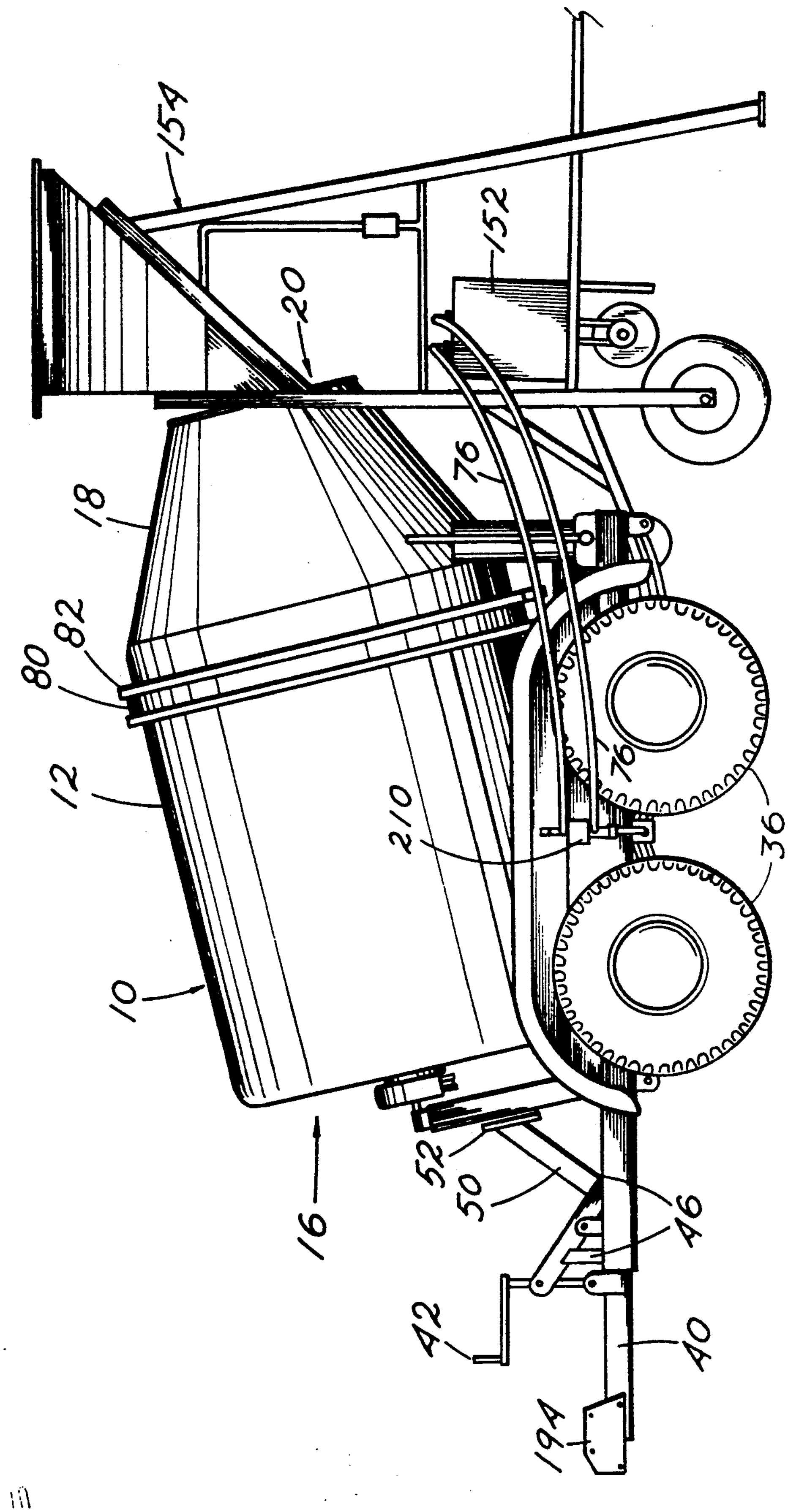

FIG. 6 shows the mixer vehicle according to the invention in the trailer structure in use illustrating the drum being loaded from a mobile batch plant. A hydraulic motor attached between the tandem wheels to turn the rotatable drum while the trailer is stationary is shown being powered by an auxiliary hydraulic pump attached to the mobile batch plant frame.

Figure 7:
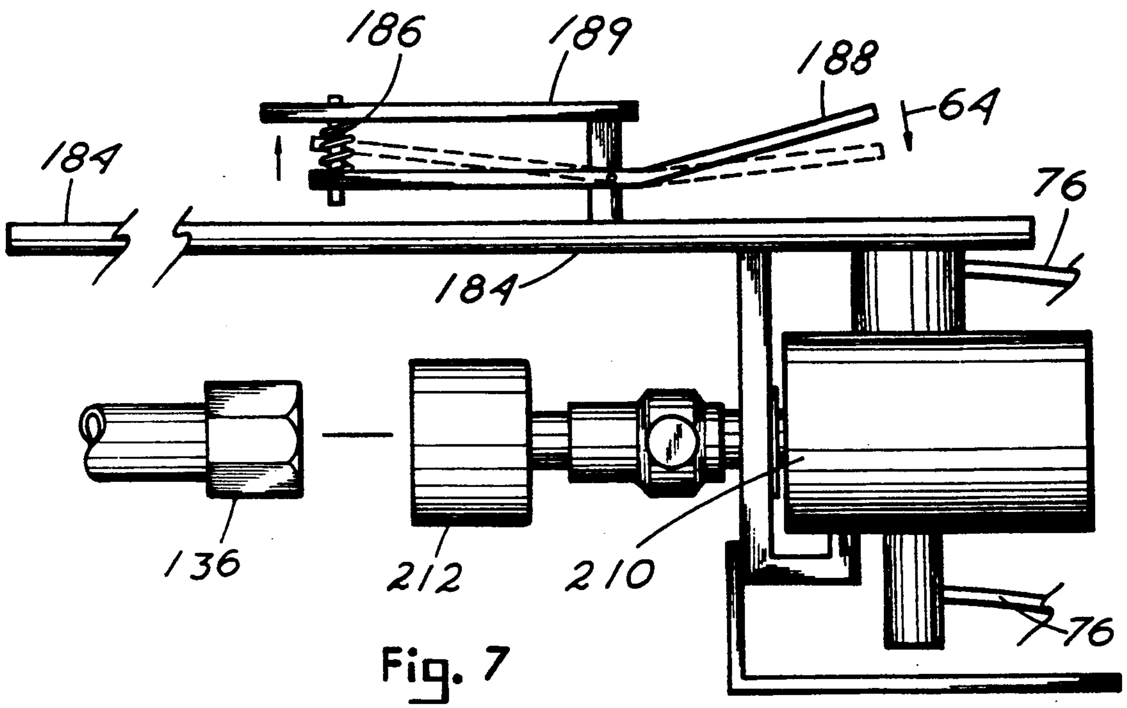

FIG. 7 shows an auxiliary hydraulic motor arranged for attachment to the mixer vehicle lifting frame coupling. The release rod for disengaging the drive shaft clutch is shown at the top of the drawing with a spring biased rod and lever operated retainer control on top. The spring biased rod of the retainer control snaps into an aperture in the clutch activator housing maintaining the clutch disengaged until released by the lever. In this illustration, the release rod structure is attached to the hydraulic motor support.

Figure 8:
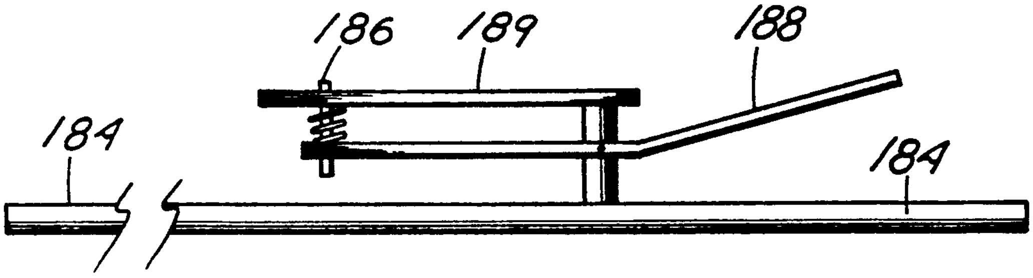

FIG. 8 shows the clutch release rod as a single unit for disengaging the shaft clutch so an auxiliary crank can be use to turn the drum.

DESCRIPTION OF THE PREFERRED EMBODIMENT

Figure 1:
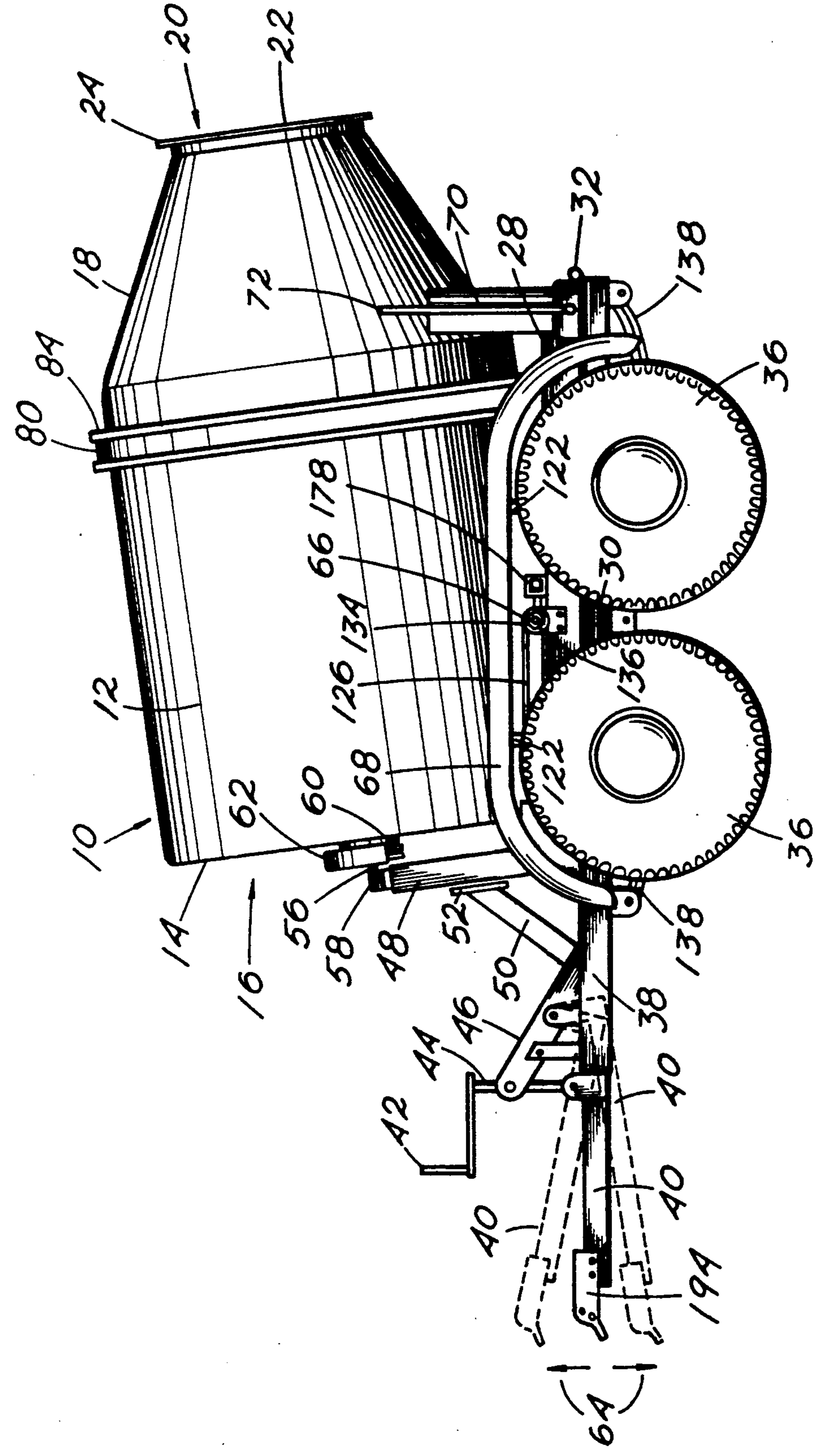
Figure 2:
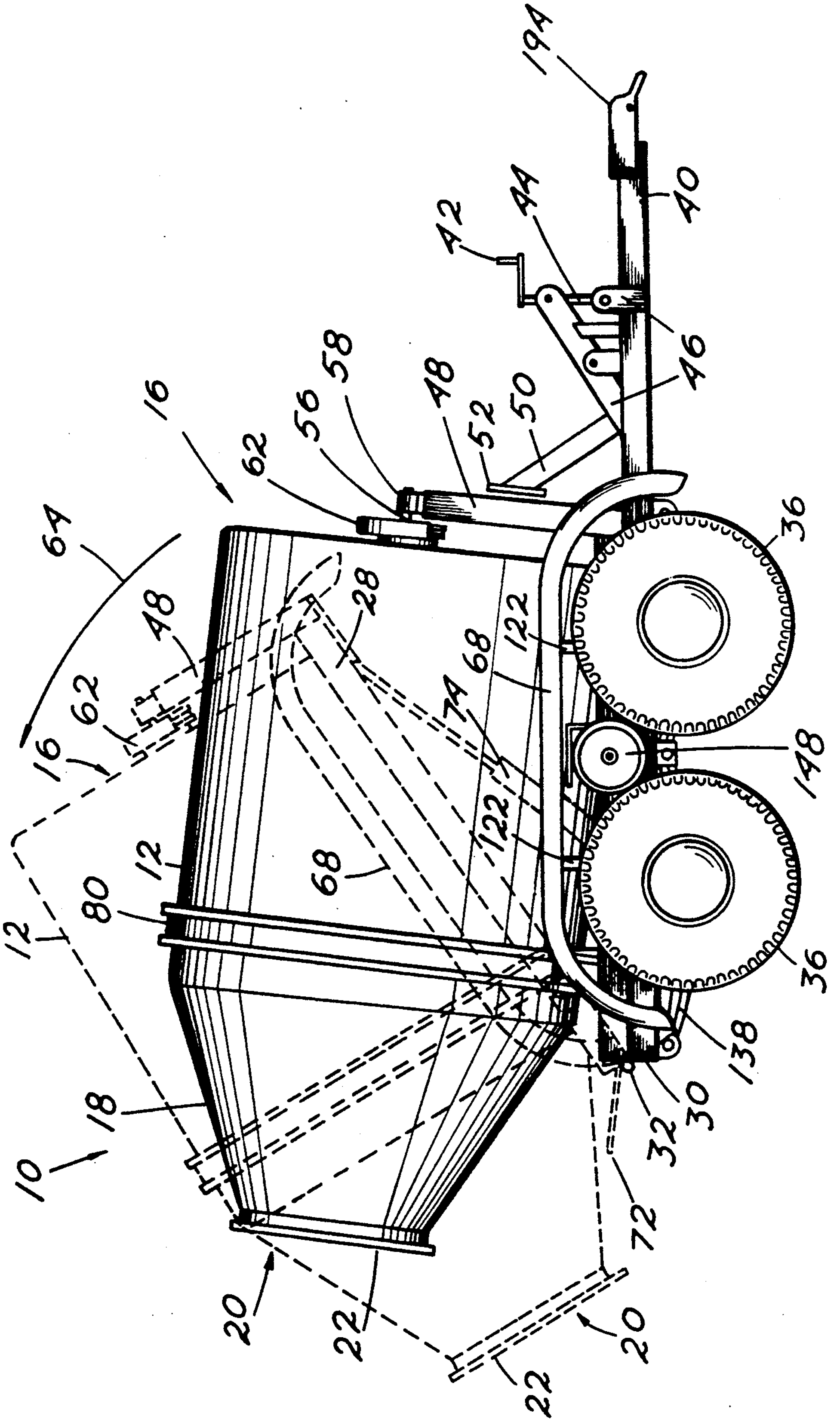
FIG. 2 shows the mixer vehicle in the trailer structure of FIG. 1 from the opposite side of the FIG. 1 view. A driver wheel for turning the rotatable drum is shown between the tandem street wheels and dotted lines illustrate the drum with an open end lower for load discharge.

Referring now to the drawings at FIGS. 1, 2, and 6 where a mixer vehicle according to the invention is illustrated in a towable trailer structure generally designated mixer trailer 10. A principal part of mixer trailer 10 is a tubular rotatable drum, drum 12, which has a drum end plate 14 closing a first drum end 16 and oppositely a second end narrowing down as drum cone 18 to second drum end 20 which has a terminal opening, drum loader opening 22. Drum loader opening 22 has loader opening collar 24 around the edge to which an auxiliary covering, loader opening cover 26, can be attached.

Figure 3:
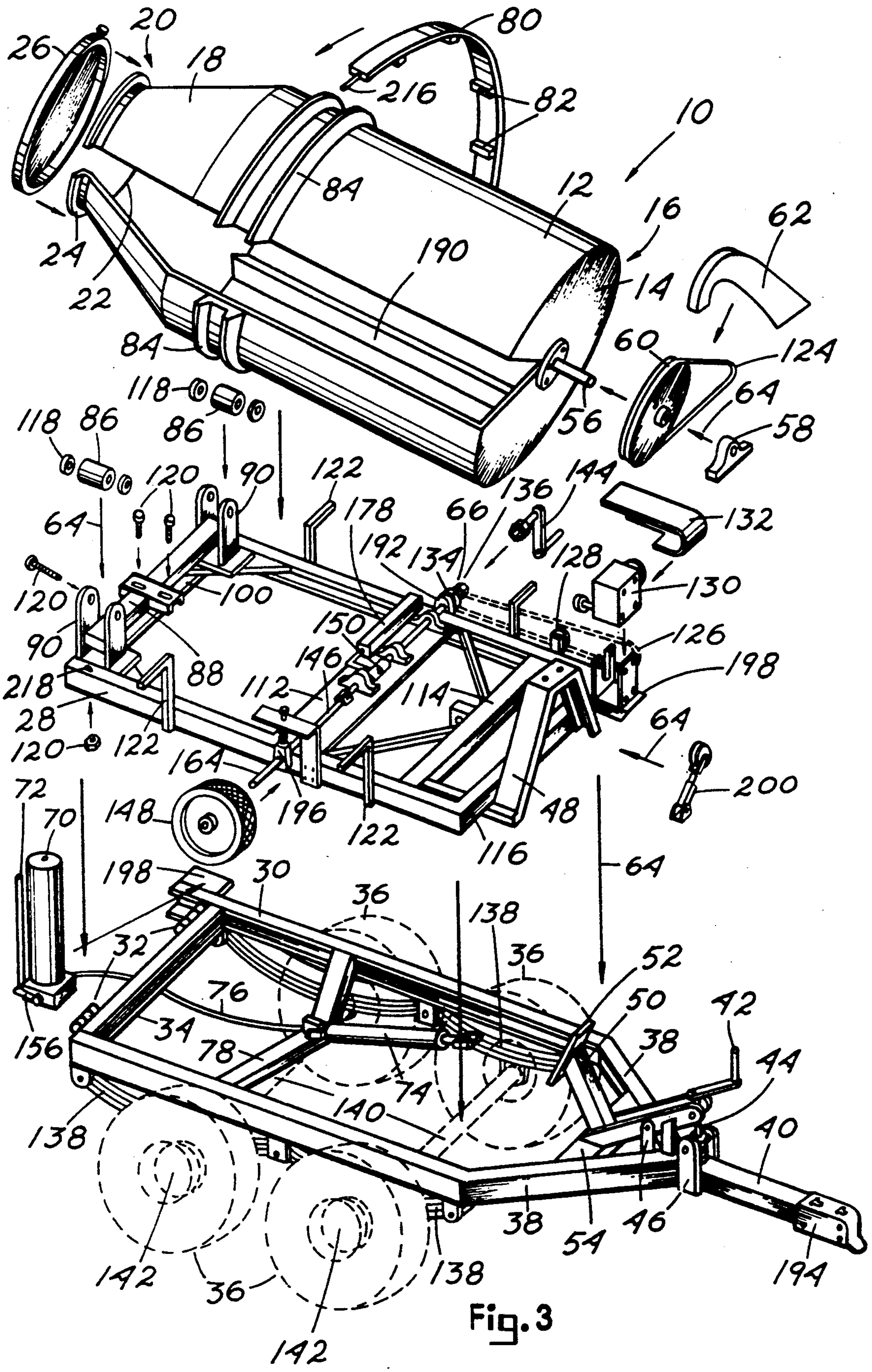
FIG. 3 is an exploded perspective view of the component parts of the invention.

Drum support frame 28, see parts illustration in FIG. 3, is a separate frame providing support and rotating attachments for rotatable drum 12. Drum support frame 28 is affixed to base frame 30 by hinges 32 on base frame rear cross member 34. Base frame 30 is supported by tandem street wheels 36 in a generally horizontal attitude longitudinally. Fenders 68 are attached to drum support frame 28 in a manner to cover the tops of tandem street wheels 36. Drum support frame 28 rests on top of base frame 30 in parallel alignment longitudinally with base frame 30. Normally, drum support frame 28 rests flat on top of base frame 30 and maintains drum 12 in a generally horizontal position with first drum end 16 lower than second drum end 20. This prevents materials being mixed inside of drum 12 during rotation from slopping out through drum loading opening 22 when loader opening cover 26 is not in use. Drum support frame 28 further includes drum support frame first center cross member 112, drum support frame second center cross support members 114, and drum support frame front cross member 116. Clutch 150 on drive shaft 146 is mounted on drum support frame first center cross member 112. Drive shaft 146 is supported at driver wheel shaft 164 end by spring biased driver wheel shaft retainer 196 and at driver pulley 134 and crank receiver stub 136 end by driver inner shaft retainer 192.

Base frame 30 is affixed at a frontal end with angled tow bar supports 38 which form a near right angle to which the rearward end of single tow bar 40 attaches at the vertex. As shown in FIG. 1, the angle of tow bar 40 relative to base frame 30 is adjustable vertically by crank 42 supported in tow bar adjust support structure 46 which repositions spring biased levering adjustment rod 44. This allows base frame 30 to be adjusted relative to the attachment height of hitch 194 onto the trailer hitch attachment ball of a towing vehicle so mixer trailer 10 rides level when towed. A safety arm 50 with a stop plate 52 affixed facing drum end plate 14 is attached to base frame front cross member 54, a cross support attached between angled tow bar supports 38. Safety arm 50 and stop plate 52 is to help prevent an accidental forward shift of a loaded rotatable drum 12 should it break lose during a sudden stop or an accident. Stop plate 52 is in close proximity to but does not contact drum end plate 14.

Mixer trailer 10 is designed for durability, stability, and safety being stabilized to prevent "fishtailing" or overturning during towing with independent suspension springs 138, tandem axles 140, and hydraulic surge brakes 142. Drum 12 rests rotatably on drum idler wheels 86 which are attached turnably in drum idler wheel mounts 90 by bolts 120 with washers 118 at each end affixed to drum idler wheel support frame 88. Drum idler wheel support frame 88 attaches to drum support frame 28 at drum support frame rear member 100.

FIG. 3 best illustrates the various parts of mixer trailer 10 which are shown disassembled. Rotatable drum 12 revolves around a center alignment indicated by the position of protruding drum axle 56 centered in drum end plate 14 and a diametric center where drum 12 rests on drum idler wheels 86 at the rear of drum support frame 28. Drum axle 56 is rotatably retained in drum axle bearing housing 58 supported by drum axle bridge 48 mounted on the front of drum support frame front cross member 116. Drum 12 is further maintained rotatably in a captive retainer strap, drum strap 80, which fits in drum strap track 84 and is attached around drum 12 by drum strap coupler 216. Drum strap coupler 216 is retained in drum strap coupler retainer 218 secured by bolts 120. Plastic bearings 82 are rectangular plastic bearings of the "Delvon" type affixed to the inner surface of drum strap 80 facing the outer surface in the center section of drum strap track 84. Plastic bearings 82 allow drum 12 to rotate freely but retained in drum strap 80. Directional arrows 64 in the illustrations represent attachment direction and movement.

Drum 12 is arranged to rotate while mixer trailer 10 is being towed and to be rotated manually by driver crank 144 removably attached to crank receiver stub 136 when mixer trailer 10 is parked. Drum 12 can also be rotated while mixer trailer 10 is parked by an auxiliary hydraulic motor 210 using crank receiver stub 136 as part of auxiliary power attachment station 66. For mixing both dry and wet materials efficiently, the interior wall of drum 12 has a longitudinal alignment of spaced agitation vanes 190 as can be seen in the opened side view of drum 12 in FIG. 3. During towing, drum 12 is rotated by driver pulley 134 located on one end of drive shaft 146 which is turned at the opposite end by rubber tired driver wheel 148 placed between tandem street wheels 36. Driver wheel 148 derives turning power from frictional contact with one or more of tandem street wheels 36. When mixer trailer 10 is being towed, turning power is transmitted from driver pulley 134 by power belt 126 to belt direction transfer gear 130 and to front pulley 60 by drum turn pulley belt 124. Proper tension for drum turn pulley belt 124 is maintained by front pulley belt idler 200. Belt direction transfer gear 130 is attached to a support platform 198 mounted to the front of drum support frame 28. Power belt 126 is protected by power belt cover 132 and front pulley 60 and drum turn pulley belt 124 are covered along the top side by front pulley cover 62. Proper tension is maintained on power belt 126 by power belt idler 128. For continued rotation of drum 12 while mixer trailer 10 is stationary, drive shaft 146 is clutched by clutch 150 to release driver wheel 148 allowing drum 12 to be turned by driver crank 144 or by auxiliary hydraulic motor 210 using auxiliary power attachment station 66. As illustrated in FIG. 6, auxiliary hydraulic motor 210 is operated remotely powered by auxiliary pump 152 which is attached to the framework of portable bulk material loader 154 useful for loading mixer trailer 10 directly at job sites.

Referring back to FIG. 1 and FIG. 2, for unloading separately mixed materials or ready mixed materials such as concrete, mixer trailer 10 features manual operated, fixed hydraulic pump 70 which operates hydraulic ram 74 to raise and lower the forward end of drum support frame 28 when hydraulic pump handle 72 is operated. See dotted outline of drum 12 in raised position shown in FIG. 2. Fixed hydraulic pump 70 with hydraulic pump handle 72 is located on a support platform 198 affixed to base frame rear cross member 34 at the second drum end 20 near drum loader opening 22 of drum 12 which is also the discharge end. Fenders 68 attached to drum support frame 28 by fender supports 122 angle upward as drum support frame angles upward. For dumping, the control, handle 72, is effortless to operate and strategically positioned so that mixed materials such as concrete can be observed while being unloaded. Pumping handle 72 raises the front end of drum support frame 28 to facilitate unloading mixed materials from drum 12. When release valve 156 on hydraulic pump 70 is opened, hydraulic ram 74, placed between drum support frame 28 and base frame 30 on base frame hydraulic ram support member 78, eases drum 12 from an angled dumping position back to the normally sloped loading and towing horizontal position with first drum end 16 somewhat lower than second drum end 20.

In FIGS. 4, 5, and 7, the clutching assemblage is illustrated which releases driver wheel 148 from turning drum 12 and allows drum 12 to be turned manually by driver crank 144 or by auxiliary hydraulic motor 210 when mixer trailer 10 is parked. FIG. 4, in a top view of a portion of drive shaft 146, shows the clutching assemblage which is operational through engagement and disengagment of interlocking couplers, slide coupler 158 and fixed coupler 160. As illustrated in FIG. 4, couplers 158 and 160 are in their normally engaged position with biasing compression spring 162 fully extended for turning rotatable drum 12 by driver wheel 148 (not shown this illustration) attached to driver wheel shaft 164. Drive shaft 146 is a two piece shaft, outer shaft piece 166 and inner shaft piece 168 with abutted ends maintained faced in fixed coupler 160. The two pieces of drive shaft 146 can turn independently. Fixed coupler 160 is secured to inner shaft piece 168 by lock bolt 170 and turns with inner shaft piece 168. Slide coupler 158 is slidably attached to outer shaft piece 166 and is held normally engaged with fixed coupler 160 by pressure from biasing compression spring 162 which is normally extended. Grease fitting 172 in fixed coupler 160 provides lubrication along driver shaft 146 through grease groove 174 to the abutted sections of drive shaft 146 and to both couplers 158 and 160. Clutch engagement arm 176, slidably affixed in clutch activator housing 178, is shown upwardly positioned in the FIG. 4 illustration. Clutch engagement arm 176 is secured by clutch collar 177 to slide coupler 158. A force applied to the free end of clutch engagement arm 176 inside of clutch activator housing 178 causes clutch engagement arm 176 to act like a gear shift, engaging and disengaging couplers 158 and 160 as force is applied and released. The FIG. 4 illustration shows how drive shaft 146 is attached by shaft bushings 180 to drum support frame first center cross member 112 of drum support frame 28 (see FIG. 3) with clutch 150 centered, driver wheel shaft 164 at one end, and driver pulley 134 at the other end. Driver wheel shaft 164 is coupled to outer shaft piece 166 by opened U-joint coupler 182 to facilitate removal of driver wheel shaft 164 without disturbing the assemblage of clutch 150. Biasing compression spring 162 abuts at one end to shaft bushing 180 and at the other end to plate 163. Plate 163 is the end covering of slide coupler 158.

FIG. 5 is a top view of the same portion of drive shaft 146 as shown in FIG. 4. Clutch 150 is disengaged. Clutch release rod 184 pushed into clutch activator housing 178 is shown applying force to the free end of clutch engagement arm 176. Clutch engagement arm 176 has been pushed to compress biasing compression spring 162 and separate couplings 158 and 160. Clutch 150 has been disengaged freeing outer shaft piece 166 and driver wheel shaft 164 so driver crank 144 can be used to manually turn drum 12 or inner shaft piece 168 can now be used with auxiliary hydraulic motor 210 and auxiliary pump 152 for turning rotatable drum 12 as shown in FIG. 6. In FIG. 5, clutch release rod 184 is shown removably retained in clutch activator housing 178 by spring biased lock pin 186. Pressing clutch lock lever 188 frees clutch release rod 184 allowing clutch release rod 184 to be removed and clutch 150 to self-return to the normally engaged position. FIG. 7 illustrates the structural assemblage of clutch release rod 184 and clutch lock lever 188 in clutch lock lever support structure 189, showing how movement of clutch lock lever 188 raises spring biased lock pin 186 freeing clutch release rod 184 for removal from clutch activator housing 178. Clutch lock lever support structure 189 including clutch release rod 184 and clutch lock lever 188, as illustrated in FIG. 8, is provided as a single unit for use with driver crank 144. For use with auxiliary hydraulic motor 210 is shown in FIG. 7, clutch lock support structure with lever 188 and spring biased lock pin 186 is provided as a part of the supporting frame of auxiliary hydraulic motor 210. As illustrated in FIG. 7, auxiliary hydraulic motor 210 is connected to inner shaft piece 168 of drive shaft 146 by hydraulic motor coupler 212 which fits over crank receiver stub 136. Auxiliary hydraulic motor 210 is operational and controllable through hydraulic lines 76 from a remote hydraulic power station.

A remote power station is illustrated in FIG. 6 in the form of auxiliary pump 152 attached in the support structure of portable bulk material loader 154. Portable bulk material loader 154 is a wheeled auxiliary dry mix loader useful with mixer trailer 10 for loading bulk materials to be mixed in drum 12 at a job site. FIG. 6 illustrates a principal advantage of the immediate invention in that drum 12 can be rotated by auxiliary hydraulic motor 210 to facilitate material mixing at a job site with mixer trailer 10 used for stationary mixing. Another advantage of clutch 150, featured in mixer trailer 10 according to this invention, is the turning of drum 12 by engagement of clutch 150 during towing and the mechanics for disengagement of clutch 150 upon reaching a destination so drum 12 can continue to be turned by driver crank 144. The turn capability of drum 12 is a big advantage when delivery of ready-mixed concrete is in progress. In trailers having non-turning hoppers used for cement delivery, the cement can set up inside the hopper becoming hardened and difficult to handle. If a delay occurs in emptying a non-turning hopper, the cement can become useless especially when ready-mixed cement is allowed to remain still for any length of time. When a gasoline motor is used on a small trailer to turn a drum, considerable trailer space is occupied by the motor, the motor mountings, and the gasoline supply tank. In the present invention, rotatable drum 12 occupies all of the trailer support area as drum 12 turns without loss of trailer space and the extra weight of a motor required to turn a drum. Therefore, mixer trailer 10 according to the immediate invention can provide greater load capacity in a small trailer than a mixing trailer of the same size which requires inclusion of a gasoline engine. With clutch 150 providing accessible rotatable mechanics for turning drum 12 while mixer trailer 10 is towed or parked, a principal disadvantage seen in most other concrete delivery trailers is overcome.

Although we have illuminated our mixer vehicle, mixer trailer 10, subject of this invention, considerably by both description in the specification and illustration in the drawings, this is not to be construed as limiting the invention to a particular mode, and the right to modify the invention within our claim scope is reserved by us. We consider it obvious that one skilled in the art could modify the invention for mobile support on a variety of transport vehicles other than a trailer, a truck bed for example. Therefore, a similar end product of the invention as modified by others skilled in the art which falls within our claim scope, will be considered our invention.

What is claimed is:

1. A mixer vehicle trailer for mixing and transporting materials, comprising in combination, a first frame having at least two sets of tandemly arranged rotatable wheels affixed thereto, and a tow hitch attached to a front end of said first frame so as to render said first frame towable with said first frame generally horizontally oriented, said tow hitch including pivotal means for a portion of said tow hitch to be angularly changed relative to said first frame, said wheels affixed to said first frame by means including suspension springs, a second frame sized and positioned to rest horizontally oriented on top of said first frame, said second frame affixed to said first frame by hinge means attached at a rear end of said second frame and a rear end of said first frame, a drum rotatably affixed to said second frame, said drum being tubular and having a closed end oriented toward said tow hitch and an oppositely disposed opened end of said drum oriented toward said rear end of said second frame, said drum affixed to said second frame by means including said drum resting on at least two rotatable idler wheels affixed to said second frame toward said rear end of said second frame, the affixment of said drum further including at least one strap affixed over said drum and to said second frame, the affixment of said drum further including a drum axle affixed to said closed end of said drum with said drum axle additionally supported by a support bearing affixed to a structural component of said second frame, said drum further being generally horizontally oriented when said second frame is horizontally disposed so as to be capable of containing materials within said drum, said drum having at least one mixing vane affixed within said drum for agitating material when within said drum during rotation of said drum, a hydraulic ram affixed to both said first frame and said second frame, a manually operable hydraulic pump affixed to said first frame adjacent said rear end of said first frame so as to allow viewing of said open end of said drum during operation of said hydraulic pump, said hydraulic pump connected by at least one line to said hydraulic ram so as to allow manual operation of said hydraulic pump and thereby extension of said hydraulic ram so as to cause said second frame with said attached drum to be pushed upward pivoting on said hinge means into an angled position relative to said first frame wherein said open end of said drum is angled downward for unloading materials from within said drum, a rotatable drive shaft affixed to said second frame, said drive shaft divided into at least a first shaft and a second shaft each positioned in end-to-end alignment with one another and releasibly coupled together by a disengagable clutch wherein rotation in said first shaft equates to rotation in said second shaft when said clutch is engaged, said first shaft having an affixed drive wheel, said drive wheel positioned to contact at least one of said wheels of said first frame when said second frame is resting generally horizontally disposed on top of said first frame so that rotation in said wheels of said first frame equates to rotation of said drive wheel and rotation in both said first and second shafts when said clutch is engaged, a gear box affixed to said second frame adjacent a front end of said second frame, said gear box connected to said second shaft of said drive shaft by first flexible linkage means, said gear box additionally connected to fittings affixed said drum axle by second flexible linkage means so that rotation in said second shaft equates to rotation in said drum, clutch disengaging means for disengaging the coupling of said rotation in said first shaft from rotation in said second shaft of said drive shaft, said clutch disengaging means including releasible means for maintaining said clutch disengaged, said second shaft of said drive shaft including an affixed crank receiving fitting allowing attachment of a hand crank to said second shaft, said hand crank when attached to said crank receiving fitting with said clutch disengaged providing means for manually rotating said second shaft and said drum, fenders affixed to said second frame and positioned over said wheels of said first frame and additionally positioned over said drive wheel so that said feeders move upward with said second frame during unloading of materials from within said drum.

2. A mixer vehicle trailer in accordance with claim 1 wherein said crank receiving fitting is further suitably structure to provide means for temporarily receiving a motor powering means for rotating said second shaft and said drum while said mixer vehicle trailer is stationary.

* * * * *